United States Patent [19]

Abraham et al.

[11] Patent Number: 4,489,145
[45] Date of Patent: Dec. 18, 1984

[54] LITHIUM BATTERY

[76] Inventors: Kuzhikalail M. Abraham, 15 Hill St., Needham Heights, Mass. 02194; S. Barry Brummer, 62-2 Jacqueline Rd.; Joseph S. Foos, 17 Wilmot Rd., both of Waltham, Mass. 02154

[21] Appl. No.: 542,981
[22] Filed: Oct. 18, 1983
[51] Int. Cl.³ .............................................. H01M 10/40
[52] U.S. Cl. ...................................... 429/197; 429/218
[58] Field of Search ................................. 429/194, 197

[56] References Cited

U.S. PATENT DOCUMENTS

| | | | |
|---|---|---|---|
| 3,185,590 | 5/1965 | Mayer et al. | 136/6 |
| 3,468,716 | 9/1969 | Eisenberg | 136/100 |
| 3,567,515 | 3/1971 | Maricle et al. | 136/6 |
| 3,578,500 | 5/1971 | Maricle et al. | 136/6 |
| 3,701,688 | 10/1972 | Gabano et al. | 429/197 |
| 3,778,310 | 2/1973 | Garth | 136/100 R |
| 3,877,983 | 4/1975 | Hovsepian | 136/6 LN |
| 4,060,674 | 11/1977 | Kleman et al. | 429/194 |
| 4,084,045 | 4/1978 | Kegelman | 429/194 |
| 4,118,550 | 10/1978 | Koch | 429/194 |
| 4,132,837 | 2/1979 | Soffer | 429/194 |
| 4,142,028 | 2/1979 | Leger et al. | 429/194 |
| 4,163,829 | 8/1979 | Kronenberg | 429/194 |
| 4,252,876 | 2/1981 | Koch | 429/197 |
| 4,374,910 | 2/1983 | Glugla | 429/197 |
| 4,416,960 | 11/1983 | Eustace et al. | 429/197 |

OTHER PUBLICATIONS

Abraham et al., (1982), J. Electrochem. Soc. 129, 2404.

Primary Examiner—Donald L. Walton

[57] ABSTRACT

The invention features the use of additives such as 2-methylfuran or related cyclic or acyclic organic compounds in non-aqueous electrolyte-containing secondary lithium cells for improving the cycle life of such cells.

13 Claims, 3 Drawing Figures

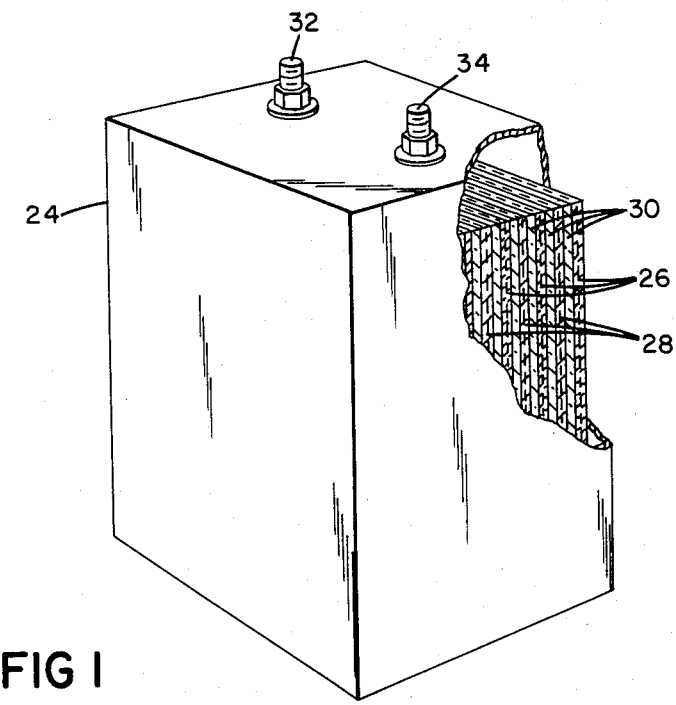
FIG I
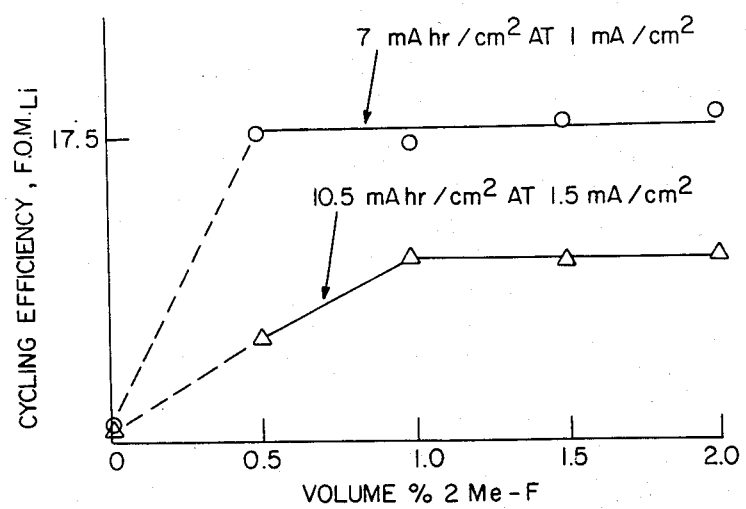
FIG 2

LITHIUM BATTERY

BACKGROUND OF THE INVENTION

The Government of the U.S.A. has rights in this invention pursuant to Contract N00014-77-C-0155 awarded by the Department of the Navy.

The invention relates to non-aqueous electrolytes employed in electrochemical cells or batteries with lithium containing electrodes.

A crucial component in an ambient temperature secondary lithium cell is the electrolyte. It is desirable to have a non-aqueous electrolyte system which provides high cycle-life, high conductivity, and reasonable cost. The number of times a lithium battery can be recharged is a measure of its cycle-life. An important factor that determines the cycle-life of a secondary lithium cell is the cycling efficiency of the lithium electrode. The cycling efficiency of the Li electrode is primarily a function of the ability of the electrolyte to withstand reduction by Li, which is a powerful reducing agent. When Li reduces the electrolyte, reaction products are deposited on the Li surface preventing subsequent smooth replating of Li during the recharge cycle. An inhomogeneous plating of Li results in dendrite growth and consequently poor Li morphology. Poor Li morphology can also result from poor throwing power of the electrolyte or from specific adsorption or from undesirable modes of adsorption of electrolyte on the Li surface. A poor Li morphology can have several consequences: (1) isolation of some of the plated Li from electrical contact with the bulk, making it unavailable for stripping during discharge; (2) short circuits between the electrodes due to dendrite growth; and (3) a rapid chemical reduction rate due to increased surface area of the electrode. Other highly desirable features of non-aqueous solvents for secondary Li cells are the ability of the solvent to dissolve an amount of salt to provide adequate conductivity and to maintain this conductivity over the wide range of temperature encountered in the terrestrial environment, say from $+50°$ C. to $-30°$ C.

Usually solvents which provide highly conducting solutions with Li salts are polar in nature. The higher the polarity of the solvent, the greater its tendency to be reduced by Li. A solvent which exemplifies these characteristics is the cyclic ether, tetrahydrofuran (THF). This solvent has been studied in depth since it has a number of physical and chemical properties which favor its use in a lithium battery. In particular, THF has a wide liquid range ($-108°$ C. to $+65°$ C. at 1 atm) and low viscosity (0.461 cp at $25°$ C.), forms highly conductive solutions of lithium salts and generally manifests low chemical reactivity. It has also been found to react less readily with Li than many other solvents that have been studied for secondary Li battery application. However, the reactivity of Li with THF is sufficiently great to render it unsuitable for Li secondary batteries requiring long cycle life.

Several strategies have been explored for tackling the reactivity problem of Li with electrolyte in secondary lithium cells. One approach has been to alloy the lithium with a less reactive metal such as Aluminum. While this seems to lower the reactivity of the lithium, it also has the adverse effects of increasing the weight of the electrode and making it more positive than a pure Li electrode.

Another approach that has been used has been to structurally modify an organic solvent so as to make it less reactive with lithium than the unsubstituted or the unfavorably substituted analogs. Well-known results of this strategy are the substituted tetrahydrofurans and tetrahydropyrans claimed in U.S. Pat. No. 4,118,550 awarded to V. R. Koch. Since the issual of this patent there have been considerable development efforts, both in industry and government, on ambient temperature secondary lithium cells utilizing one member of the substituted tetrahydrofurans, namely 2-methyltetrahydrofuran (2Me-THF), as the electrolyte solvent. The electrolyte salt that works the best so far in 2Me-THF is $LiAsF_6$. Koch indicated that the position of alkyl substituent on the tetrahydrofuran molecule is very important in making the solvent less reactive than tetrahydrofuran itself. Thus the less reactive solvents are 2-methyltetrahydrofuran (2Me-THF) and 2,5-dimethyltetrahydrofuran, (2,5-di-Me-THF) while 3-methyltetrahydrofuran (3Me-THF) is as reactive as tetrahydrofuran itself. There is, however, one paradox in this approach. This is as follows. While methyl substitution at the 2, or the 2 and 5 positions in THF make it less reactive, this also results in electrolyte solutions less conductive than THF itself. In the alkyl substituted tetrahydrofurans, a compromise choice between reactivity and conductivity is 2Me-THF. The preferred salt with this solvent is $LiAsF_6$. The usually used concentration range of the salt is between 1.0 and 1.5 moles/liter (M). Although the cycle-life of a secondary lithium cell utilizing 2Me-THF/$LiAsF_6$ (1.4M) is significantly longer than that of a cell utilizing THF/$LiAsF_6$(1.4M), cells using the former electrolyte show poorer power capabilities, especially at temperatures below $0°$ C. (K. M. Abraham, J. L. Goldman and D. L. Natwig, J. Electrochem. Soc., 129, 2404 (1982)). The low temperature capability of secondary cells utilizing THF/$LiAsF_6$ (1.5M), on the other hand, is significantly better with useful performance capabilities down to $-30°$ C. However, the cycle-life of secondary Li cells with THF are very poor.

Accordingly, an object of this invention is to provide a means of significantly improving the cycle-life of cells with THF/$LiAsF_6$, so as to result in longer cycle-life secondary lithium cells showing superior power capabilities and wider temperature ranges.

A second object is to provide a general method for obtaining significantly longer cycle-life for secondary lithium cells which utilize solvents which are normally very reactive with lithium, but otherwise possess a number of attractive properties suitable for use in secondary lithium cells, such as high solution conductivity, a wide temperature range with good solution conductivity and solution fluidity, and high thermal stability. An example of such a solvent again, is THF.

SUMMARY OF THE INVENTION

In general, the invention features a rechargeable electrochemical cell which includes a lithium-containing anode, a cathode, and an electrolyte, the electrolyte including a non-aqueous solvent in which a lithium salt and an additive are dissolved, the additive being present in an amount sufficient to improve the cycle-life of the cell and being a cyclic or acyclic 5- or 6-member organic compound of the general formulas

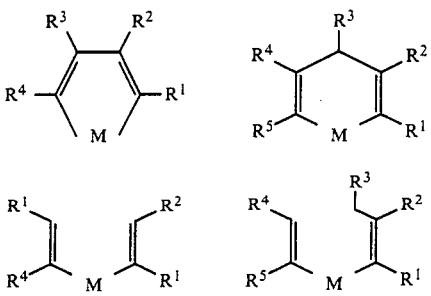

where each $R^1$, $R^2$, $R^3$, $R^4$ and $R^5$, independently, is hydrogen or lower alkyl and M is oxygen, sulfur, selenium, tellurium, or hydrogenated or lower alkyl-substituted X, where X is nitrogen, phosphorous, arsenic, antimony, or carbon.

In a preferred embodiment the additive is 2-methylfuran (2Me-F), typically in 0.5 to 5.0 volume-percent, the salt is $LiAsF_6$, and the solvent is THF.

The cycle-life of secondary lithium cells according to this invention is significantly and dramatically improved over those without the additive.

We have also discovered other additives suitable for improving the cycle life of secondary Li cells with THF/$LiAsF_6$. These compounds, also effective in quantities of 0.50 to 5.0 volume percent of the total electrolyte, are structurally related to 2Me-F, and they are: Furan (F), 2,5 dimethyl furan (2,5-di-Me-F), 2-Methyl-4,5-dihydrofuran, 2-methyl-thiophene (2Me-T), 2,5-dimethyl thiophene (2,5-di-Me-T), and N,methylpyrrole (N,Me-P).

We have discovered that these additives, especially 2Me-F, significantly extend the cycle life of cells utilizing 2Me-THF/$LiAsF_6$.

To date we have found 2Me-F most effective as an additive in cyclic ethers, particularly THF and 2Me-THF.

In addition to 2Me-F, we have found many other useful additives for improving the Li cycling ability of 2Me-THF- and THF-based electrolytes. The effectiveness of these activities varies.

Other features and advantages of the invention will be apparent from the following description of the preferred embodiment thereof, and from the claims.

DESCRIPTION OF THE PREFERRED EMBODIMENT

We first briefly describe the drawings.

DRAWINGS

FIG. 1 is a diagrammatic representation of a rechargeable lithium cell employing an electrolyte of the invention.

FIG. 2 is a graph showing the effect of varying amounts of 2Me-F on the cycle-life of Li/$TiS_2$ cells with THF/$LiAsF_6$(1.5M).

Figure 3:
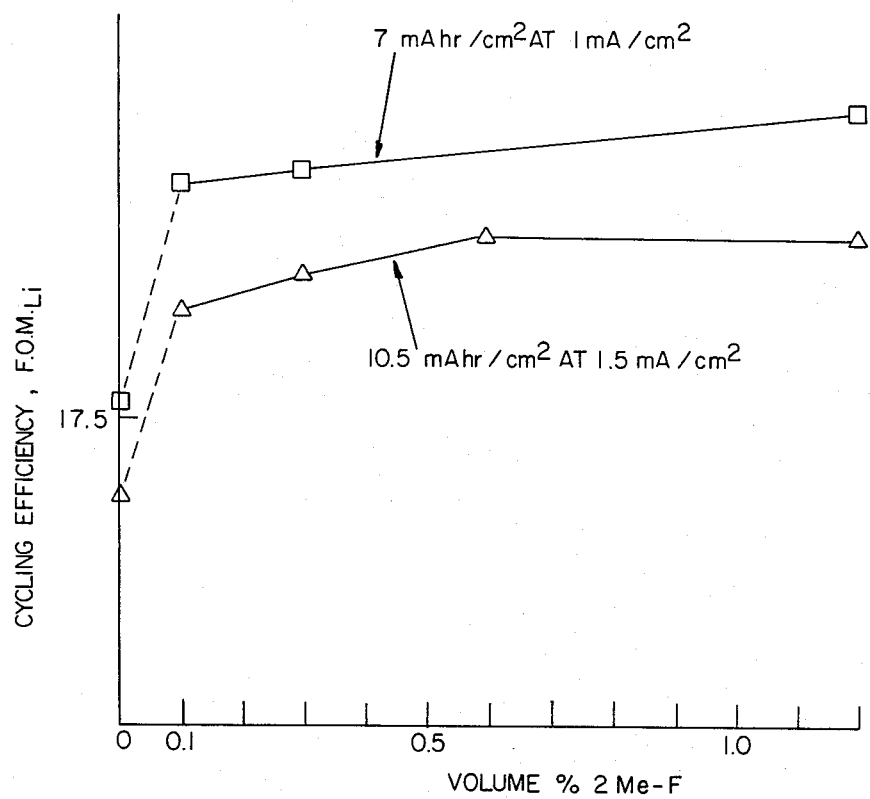
FIG. 3 is a graph showing the effect of varying amounts of 2Me-F on the cycle-life of Li/$TiS_2$ cells with 2Me-THF/$LiAsF_6$(1.5M).

The following embodiments further illustrate the general significance and advantages of this invention and enable those skilled in the art to understand and practice the invention.

The term "lower alkyl" includes straight-chain and branched acyclic hydrocarbons having from 1 to 4 carbon atoms. The term "aryl group" is meant to include those derived from aromatic hydrocarbons such as benzene and unsaturated heterocycles such as pyrrole.

There is shown in FIG. 1 a schematic representation of an example of a rechargeable electrochemical cell which could be used in conjunction with the subject electrolyte. The illustrated battery comprises a sealed battery case 24 within which is disposed a plurality of flat negative electrodes 26 consisting of essentially pure lithium deposited on nickel substrates, a plurality of flat positive electrodes 28 consisting of titanium disulfide deposited on expanded nickel, and a plurality of separators 30 in the form of flat porous mats made of microporous polypropylene film (Celgard) or glass fibers. The positive and negative electrodes are arranged alternatively with one another and a separator is disposed between each pair of positive and negative electrodes. The positive electrodes of the several cells are electrically coupled in parallel to a positive terminal 32 by suitable electrical conductors (not shown) in accordance with conventional battery fabrication technology, and the negative electrodes of the several cells are similarly connected to a negative battery terminal 34. The subject electrolyte surrounds the electrodes and separators.

The advantages of the invention are best illustrated by the cycle-lifes of hermetically sealed Li/$TiS_2$ cells utilizing the embodiments of the invention. The Li/$TiS_2$ secondary cell test vehicle referred to is the standard Li/$TiS_2$ cells we have described elsewhere (K. M. Abraham, J. L. Goldman and D. L. Natwig, J. Electrochem. Soc., 129, 2404 (1982)). When this standard Li/$TiS_2$ secondary cell is used as the test vehicle for evaluating the effects of the various additives, the only variable introduced into the cell from one test to the other is the additive itself; i.e., whether there is an additive or not, and when there is an additive the type of the additive. This results in a clear demonstration of the effect of the additive on the cycle-life of the Li/$TiS_2$ cell.

The Li/$TiS_2$ secondary cell included two cathodes and three Li anodes, arranged in an alternating fashion with Li forming the outer electrodes in the stack. Each cathode had an area of 10 cm$^2$/side so that the total cathode area was 40 cm$^2$. The total cathode capacity was 680 mA-hr (based on 1e$^-$/$TiS_2$) or 17 mA-hr/cm$^2$. The Li electrode fabricated from 10 mil Li foil. The middle electrode had two pieces of the Li foil (10 cm$^2$) on each side of the Ni screen and the outer electrode had one piece of Li (10 cm$^2$) on the side of the Ni screen facing the cathode. The total theoretical Li capacity typically was 1820 mA-hr (45.5 mA-hr/cm$^2$). Each Li electrode was bagged in two layers of Celgard 2400 ™, polypropylene separator. The electrode package was introduced into a D-cell can (Ni plated cold-rolled steel) and compression was applied to the electrode package by Teflon hemicylinders. The cell was vacuum filled with ~12 ml electrolyte through a fill-tube on the cell cover assembly.

Cells were cycled galvanostatically with the aid of standard cycling equipment. The potential limits were 1.6 V for discharge and 3.0 V for charge. However, the cells were discharged to depths of 7 or 10 mA-hr/cm$^2$ only, so that the lower voltage limit was reached only toward the end of cell life. A cell was considered failed when its capacity decreased to less than 50% of the discharge capacity desired in a particular cycling regime. Since $TiS_2$ is a highly reversible positive electrode (see U.S. Pat. No. 4,007,055, issued to M. Stanley Whittingham), cell failure occurs due to the failure of the Li electrode as a result of this electrode's reactivity with the electrolyte. Thus, the cycle-life of the cell, measured by the total number of discharge-charge cycles, is a measure of the extent of reactivity of the electrolyte with the lithium electrode. A beneficial effect of an additive is indicated by a larger number of cycles than without the additive. The beneficial effect of an additive can also be described in terms of the Figures of Merit (F.O.M.$_{Li}$) for the cycling of the Li electrode, according to the relationship $$F.O.M._{Li} = \frac{\text{Total accumulated discharge capacity}}{\text{Theoretical Li capacity}}$$

An advantage of this invention is exemplified by the data in Table 1 which gives the cycle-lifes of Li/TiS$_2$ cells utilizing THF/LiAsF$_6$(1.5M) with and without 2Me-F.

TABLE 1

EFFECT OF 2Me—F ON THE CYCLE LIFE OF Li/TiS$_2$ CELLS WITH THF/LiAsF$_6$ (1.5M)

| Cell Number | Amount of 2Me—F (Volume-Percent) | Li Charge Density (mAh/cm$^2$) | Current Density (mA/cm$^2$) | Number of 100% Cycles | F.O.M.$_{Li}$ |
|---|---|---|---|---|---|
| 327-140-19 | 0.0 | 7 | 1 | 7 | 2.4 |
| 327-140-42 | 0.0 | 7 | 1 | 6 | 2.2 |
| 285-98-01 | 0.0 | 10.5 | 1.5 | 5 | 1.7 |
| 363-35-10 | 0.5 | 7 | 1 | 111 | 9.2 |
| 363-35-32* | 0.5 | 7 | 1 | 92 | 15.9 |
| 285-98-20 | 0.5 | 10.5 | 1.5 | 17 | 5.5 |
| 285-98-21 | 0.5 | 10.5 | 1.5 | 18 | 5.8 |

*Stored 14 days at 50° C. prior to cycling.

TABLE 2

EFFECT OF 2Me—F ON THE CYCLE LIFE OF Li/TiS$_2$ CELLS WITH 2Me—THF/LiAsF$_6$(1.4M)

| Cell Number | Amount of 2Me—F (Volume-Percent) | Li Charge Density (mAh/cm$^2$) | Current Density (mA/cm$^2$) | Number of 100% Cycles | F.O.M.$_{Li}$ |
|---|---|---|---|---|---|
| 285-98-18 | 0.0 | 7 | 1 | 96 | 17.6 |
| 285-75-10 | 0.0 | 7 | 1 | 92 | 16.2 |
| 285-98-07 | 0.3 | 7 | 1 | 150 | 31.7 |
| 285-75-08 | 0.0 | 10.5 | 1.5 | 26 | 13.2 |
| 285-75-09 | 0.3 | 10.5 | 1.5 | 67 | 25.7 |

Without any 2Me-F the cells exhibit 6 and 7 cycles respectively when cycled at a current density of 1 mA/cm$^2$ and a charge density of 7 mA-hr/cm$^2$. When cycled at 1.5 mA/cm$^2$ with 10.5 mA-hr/cm$^2$, the cell without any 2Me-F gives 5 cycles. The cycle-lifes of the cells show a dramatic and significant increase with the addition of 0.5 percent by volume of 2Me-F to the electrolyte. These latter type of cells exhibit cycle lifes of the order of 92–111 cycles when tested at 1 mA/cm$^2$ and 7 mA-hr/cm$^2$ and 17–18 cycles when tested at 1.5 mA-hr/cm$^2$ and 10.5 mA/cm$^2$. The data obtained from Cell No. 363-35-32, given in Table 1, indicate that the cells containing 2Me-F have good storage capability at 50° C.

Another advantage of this invention is exemplified by the data in Table 2 which gives cycle-lifes of Li/TiS$_2$ cells utilizing 2Me-THF/LiAsF$_6$ (1.4M). It is clear that the cycle-lifes of the cells are nearly doubled with 0.3 percent by volume of 2Me-F in the electrolyte.

It is believed that 2Me-F is effective because it forms a protective film on the Li surface. This film is believed to be electronically insulating while ionically conducting, thus permitting electrochemical discharge and recharge of Li during discharge/charge cycles, while preventing or significantly slowing down direct chemical reactions between the Li surface and the electrolyte. Thus in a cell with a certain amount of Li anode capacity the maximum effectiveness of 2Me-F is found at a certain additive concentration, determined by the exposed surface area of the Li anode. This is exemplified by the data in FIGS. 2 and 3 for cells utilizing THF/LiAsF$_6$ and 2Me-THF/LiAsF$_6$, respectively. In the former cells the strongest effect is realized for the range of 0.5–1.0 volume percent of 2Me-F, while in the latter cells such an effect is realized for 0.10 to 0.60 volume percent of 2Me-F.

The organic compound which is effective as an additive is believed to be a 5 or 6 membered heterocycle with at least one unsaturated center. Thus, prominent examples of the additives are furan (F), 2Me-F, 2,5-di-Me-F, thiophene (T), 2Me-T, 2,5-di-Me-T, N,methyl-pyrrole (N, Me-P), pyran (Py), and 2Me-Pyran (2Me-Py). The structural formulas of the two classes as additives are given below:

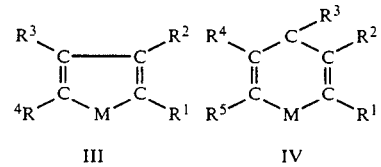

III         IV

R$^1$ = H or lower alkyl
R$^2$ = H or lower alkyl
R$^3$ = H or lower alkyl
R$^4$ = H or lower alkyl
R$^5$ = H or lower alkyl
M = O, S, Se, Te or
M = >N-H, >N-Me, >P-Me, >As-Me, >Sb-Me or
M = CR$_2$, R = H or lower alkyl It is believed that the various compounds belonging to these two classes are effective as additions when there is at least one double bond in the ring structure. The results tabulated in Table 3 clearly support this belief. The data in Table 3 also illustrate the generality of the present invention.

It is our belief that certain acyclic analogs of the above two structural units are also effective in prolonging the cycle-life of secondary lithium cells. The latter group of compounds may be espcially useful as mixed additives with their cyclic analogs. An example of this is 2,4-dimethyl-1,3-pentadiene, V. Its effectiveness has been demonstrated as shown in Table 3.

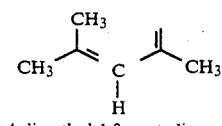

2,4-dimethyl-1,3-pentadiene, V

For a high energy density ambient temperature battery embodying this invention, the negative electrode material preferably consists of lithium of as high purity as possible. Nevertheless, for certain other battery applications it may consist of a lithium alloy or amalgam. If a lithium alloy is used, it preferably is a lithium-tin, lithium-lead, lithium-gold, lithium-platinum, lithium-cadmium, lithium-mercury, lithium-zinc, lithium-silver, lithium-aluminum or lithium-magnesium alloy having at least 50%, more preferably at least 65% lithium by weight.

TABLE 3

EFFECT OF VARIOUS ADDITIVES ON THE CYCLE-LIFE OF CELLS UTILIZING THF/LiAsF$_6$

| Additives | Percent by Volume Added to THF/LiAsF$_6$(1.5M) | Number of Cycles* |
|---|---|---|
| None | 0.5 | 7 |
|  | 0.5 | 46 |
| 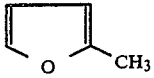 | 0.5 | 110 |
| 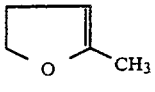 | 0.5 | 12 |
| 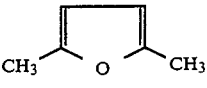 | 0.5 | 37 |
| 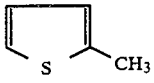 | 0.5 | 27 |
| 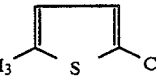 | 0.5 | 38 |
| 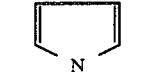 | 0.5 | 10 |
| 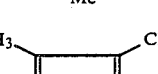 | 0.5 | 12 |
| 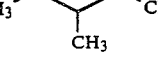 | 0.5 | 14 |
| 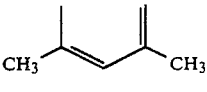 | 0.5 | 32 |
| 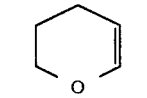 | 0.5 | 28 |

For a high energy density ambient temperature battery, the positive electrode material preferably consists of titanium disulfide (TiS$_2$). Preferably this positive electrode material is made in accordance with the teachings of U.S. Pat. No. 4,007,055, issued Feb. 8, 1977 to M. Stanley Whittingham. However, for other less stringent battery applications the positive electrode material may comprise other transition metal compounds and notably other insoluble chalcogenides of titanium, zirconium, hafnium, vanadium, niobium, tantalum, molybdenum, tungsten, rhenium, platinum, germanium, iron, tin and lead, e.g., TiS$_3$, TiSe$_2$, TiSe$_3$, ZrS$_2$, ZrS$_3$, HfS$_2$, HfS$_3$, VS$_2$, VS$_3$, NbS$_2$, NbS$_3$, TaS$_2$, TaS$_3$, ZrSe$_2$, ZrSe$_3$, HfSe$_2$, HfSe$_3$, VSe$_2$, VSe$_3$, NbSe$_2$, NbSe$_3$, TaSe$_2$, TaSe$_3$, and alloys of the foregoing cations such as ZrHfSe$_2$. Other positive electrode materials may comprise mixed sulfides such as Fe$_x$V$_{1-x}$S$_2$ and Cr$_x$V$_{1-x}$S$_2$ (x<1) and sulfide compounds such as NiPS$_3$ and metal oxides such as MoO$_3$, V$_6$O$_{13}$, V$_2$O$_5$ and Cr$_x$O$_y$ where y/x is between 1.5 and 3. Soluble and partially soluble positive electrode materials also may be used, notably I$_2$, Br$_2$, Cl$_2$, SO$_2$, S, CuCl, CuCl$_2$, AgCl, FeCl$_2$, FeCl$_3$, and other transition metal halides. Other soluble positive electrode materials that may be used are lithium polysulfide (Li$_2$S$_n$) and organic compounds such as chloranil and fluoranil. In the case of Li$_2$S$_n$, it is preferred that n be approximately 10. Titanium disulfide is the preferred positive electrode material because of electrical, weight and cost consideration.

Preferably the cathode structure consists of the positive electrode material deposited on a suitable substrate such as carbon, nickel, or zinc but the cathode structure may consist entirely of the positive electrode material where the latter is capable of serving as its own current collector. A preferred cathode structure consists of titanium disulfide mixed with carbon and pressed onto a nickel substrate. In the case where the positive electrode material is soluble in the electrolyte to a significant extent, e.g., lithium polysulfide, any suitable electronic conductor which is not soluble in or reactive with the electrolyte may be used as the cathode current collector, e.g. carbon or nickel or carbon in a plastic matrix such as Teflon or polyethylene.

The concentration of the solute (ionic conductor) in the solvent is not critical. It is preferred to incorporate the minimum amount sufficient to yield the desired level of conductivity when the cell is fully charged. By way of example, the salt concentration should be such as to preferably give a specific conductivity of at least about $5 \times 10^{-5}$ ohm$^{-1}$cm$^{-1}$ to about 22° C. In practice, a 1.0 to 2.5M concentration of solute in the solvent generally will provide a suitable level of ionic conductivity. The preferred salt is LiAsF$_6$. However, other popular lithium salts such as LiClO$_4$, LiBR$_4$(where R=alkyl or aryl groups), LiPF$_6$, LiAlBr$_4$, LiSCN, LiAlCl$_4$, LiBF$_4$, LiBf, and lithium salts of organic acids such as trichloroacetic, trifluoromethane sulfonic and formic acids can be used.

The electrolyte solvents preferred are THF and 2Me-THF. However, we believe, certain embodiments of the invention are equally applicable with other popularly used organic solvents such as dioxolane, 1,2-dimethoxyethane (DME), diethylether, dimethoxymethane, trimethoxy methane, tetrahydropyran, 2Methyl-tetrahydropyran, 3-methyltetrahydrofuran, 2,5-dimethyl tetrahydrofuran, and 2,5-dimethyl tetrahydropyran.

It is to be understood that the invention is susceptible to a number of obvious modifications. Thus the additive can be a mixture of the compounds noted, and the electrolyte may comprise a mixture of solvents including, for example, THF and 2Me-THF or THF and 2,5-di-Me-THF, and the salt may be a mixture of lithium salts.

Also electrolytes made in accordance with this invention may be used in cells where the anode essentially includes or is a material other than lithium, e.g., potasium, sodium, magnesium, calcium or zinc, or a mixture thereof with or without lithium. Furthermore while the invention is most advantageous in providing high energy density secondary cells, the electrolyte may be formulated so as to provide stable low or medium energy density cells. Still other modifications and advantages will be obvious to persons skilled in the art, and are within the following claims.

What is claimed is:

1. A rechargeable cell comprising a lithium-containing anode, a cathode, and an electrolyte, said electrolyte comprising a solvent, a lithium salt, and an additive in an amount sufficient to improve the cycle-life of said cell, said additive comprising a 5- or 6-member cyclic or acyclic organic compound of the general formulas

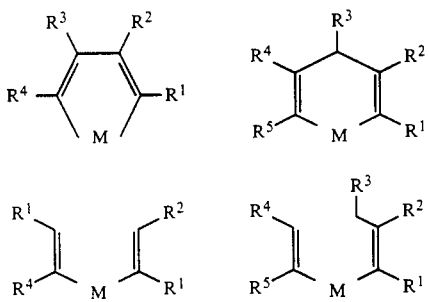

where each $R^1$, $R^2$, $R^3$, $R^4$ and $R^5$, independently, is hydrogen or lower alkyl and M is oxygen, sulfur, selenium, tellurium, or hydrogenated or lower alkyl-substituted X, where X is nitrogen, phosphorous, arsenic, antimony, or carbon.

2. The cell of claim 1 wherein said additive is present in said electrolyte in a concentration of 0.5% to 5% by volume of said solvent.

3. The cell of either of claims 1 or 2 wherein said additive comprises furan, 2-methylfuran, 2,5-dimethylfuran, thiophene, 2-methylthiophene, 2,5-dimethylthiophene, N,methylpyrrole, pyrane, or 2-methylpyran.

4. The cell of claim 1 wherein said solvent comprises tetrahydrofuran, 2-methyltetrahydrofuran, dioxolane, 1,2-dimethoxyethane, diethylether, dimethoxymethane, trimethoxymethane, tetrahydropyran, 2-methyltetrahydropyran, 3-methyltetrahydrofuran, 2,5-dimethyltetrahydrofuran, or 2,5-dimethyltetrahydropyran.

5. The cell of claim 1 wherein said lithium salt is present in a concentration of 1.0 to 2.5M.

6. The cell of either of claims 1 or 5 wherein said lithium salt comprises $LiAsF_6$; $LiClO_4$; $LiBR_4$ where each R is the same or different lower alkyl or aryl group; $LiPF_6$; $LiAlBr_4$; $LiSCN$; $LiAlCl_4$; $LiBF_4$; $LiBr$; lithium trichloroacetate; lithium trifluoromethane sulfonate; or lithium formate.

7. The cell of claim 1 wherein said anode is lithium or a lithium alloy containing at least 50% lithium by weight.

8. The cell of claim 7 wherein said alloy comprises lithium-tin, lithium-lead, lithium-gold, lithium-platinum, lithium-cadmium, lithium-mercury, lithium-zinc, lithium-silver, lithium-aluminum, or lithium magnesium.

9. The cell of claim 1 wherein said aditive comprises furan or 2-methylfuran.

10. The cell of claim 9 wherein said additive is present in said electrolyte in a concentration of 0.5% by volume of said solvent.

11. The cell of claim 10 wherein said solvent comprises tetrahydrofuran or 2-methyltetrahydrofuran.

12. The cell of claim 11 wherein said anode is lithium.

13. The cell of claim 1 wherein said anode is lithium, said solvent is tetrahydrofuran, said lithium salt is $LiAsF_6$ present in a concentration of 1.0 to 2.5M, and said additive is 2-methylfuran present in an amount of 0.5% by volume of said solvent.

* * * * *